(12) United States Patent
Dolman

(10) Patent No.: US 10,027,202 B2
(45) Date of Patent: Jul. 17, 2018

(54) POWER GENERATION APPARATUS WITH ROTOR AND STATOR ROLLING ALONG A GUIDE MEANS

(71) Applicant: Russell Dolman, Chesire (GB)

(72) Inventor: Russell Dolman, Chesire (GB)

( * ) Notice: Subject to any disclaimer, the term of this patent is extended or adjusted under 35 U.S.C. 154(b) by 164 days.

(21) Appl. No.: 15/060,584

(22) Filed: Mar. 3, 2016

(65) Prior Publication Data

US 2016/0197533 A1 Jul. 7, 2016

Related U.S. Application Data

(63) Continuation of application No. PCT/GB2014/052691, filed on Sep. 4, 2014.

(30) Foreign Application Priority Data

Sep. 6, 2013 (GB) .................................. 1315889.4

(51) Int. Cl.
*H02K 7/18* (2006.01)
*H02K 35/02* (2006.01)
*H02K 1/27* (2006.01)
*H02K 7/116* (2006.01)

(52) U.S. Cl.
CPC ............. *H02K 7/1807* (2013.01); *H02K 1/27* (2013.01); *H02K 7/116* (2013.01); *H02K 7/1853* (2013.01); *H02K 7/1869* (2013.01); *H02K 7/1876* (2013.01); *H02K 35/02* (2013.01)

(58) Field of Classification Search
CPC .... H02K 7/1807; H02K 7/116; H02K 7/1853; H02K 7/1869; H02K 7/1876; H02K 7/02; H02K 7/025; H02K 1/27; H02K 35/02; H02K 35/00; H02K 41/00; H02K 41/06; H02K 41/065; H02K 53/00
USPC ............................................. 310/12.14, 12.09
See application file for complete search history.

(56) References Cited

U.S. PATENT DOCUMENTS

2007/0249457 A1* 10/2007 Tesar ...................... H02K 7/116
310/90.5
2011/0260564 A1* 10/2011 Rodger ..................... H02K 7/06
310/83

FOREIGN PATENT DOCUMENTS

EP    1429444 A1    6/2004
GB    2463129 A  *  3/2010  ............. H02K 35/02

OTHER PUBLICATIONS

International Search Report dated Jun. 30, 2015 in parent PCT Application No. PCT/GB2014/052691.

* cited by examiner

*Primary Examiner* — Michael Andrews
(74) *Attorney, Agent, or Firm* — Richard A. Castellano; DNL Zito Castellano

(57) ABSTRACT

A power generation apparatus comprising at least one magnet, the magnet or magnets being arranged to form a substantially cylindrical rotor about an axle; at least one electrically-conductive pickup arranged, in use, such that rotation of the magnet or magnets about the axle induces an electrical current in the pickup; a guide or drive means along which, in use, the axle rolls to rotate the magnet; and means for moving the guide means to cause the axle to roll along it; and wherein the at least one electrically-conductive pickup is fixed relative to a stator, which stator at least partially surrounds the rotor and is rotatably connected to the axle such that the rotor and stator move in unison relative to the guide means.

20 Claims, 5 Drawing Sheets

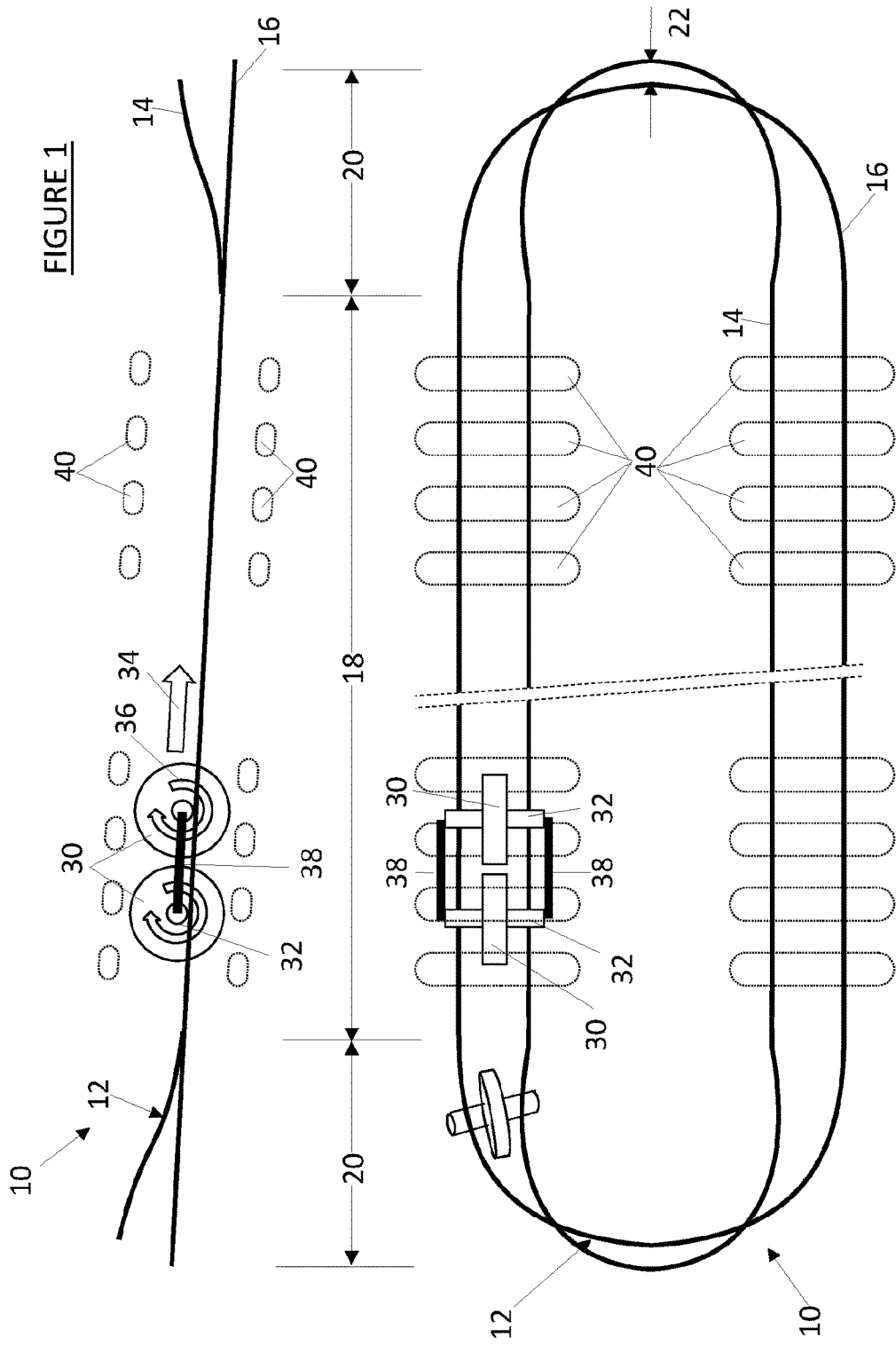

POWER GENERATION APPARATUS WITH ROTOR AND STATOR ROLLING ALONG A GUIDE MEANS

CROSS-REFERENCE TO RELATED APPLICATIONS

This application is a continuation under 35 U.S.C. § 120 of International Application No. PCT/GB2014/052691, filed Sep. 4, 2014 (and published by the International Bureau as WO 2015/033150), which claims priority to GB Application No. 1315889.4, filed Sep. 6, 2013. Each of the above-referenced patent applications is hereby incorporated by reference in its entirety.

BACKGROUND OF THE INVENTION

Field of the Invention

This invention relates to a power generation apparatus, and in particular, but without limitation, to a power generation apparatus adapted to convert a reciprocating mechanical input into electrical power.

Description of the Related Technology

Mechanical-electrical power generators are well known and have been available for many years, the most common type being a dynamo, which converts a rotational mechanical input into electrical power. A dynamo comprises a rotor provided with electrical coils, which is arranged to rotate within a magnetic stator whereby the relative movement of the coils and magnets induces an electrical current in the coils, which can be drawn from the dynamo via brushes which make contact with the coil or coils at certain rotational positions. The efficiency of dynamo-type generators has, in recent times, increased, thereby providing a relatively efficient means to generate power using a rotating mechanical input. In many cases, the rotational mechanical input can be provided by a turbine, which is driven by the movement of a fluid, such as, say, steam in a power station, or the wind in the case of a wind turbine generator.

Unfortunately, the overall efficiency of a dynamo-type power generation system, that is to say, the combination of turbine and generator, can be significantly reduced by the efficiency of the turbine, or the turbine-generator coupling. For example, the efficiency of a wind turbine generator is largely limited by the efficiency of the turbine blades, which convert the substantially linear movement of the wind into a rotational output. Moreover, wind turbines generally rotate at speeds which are too slow for the generator, in which case a gearbox needs to be provided, which steps-up the output speed of the turbine to an acceptably high input speed at the generator input. Mechanical losses in the gearbox can lead to significant efficiency losses in the system overall.

In these respects, some work has been carried out previously to develop linear power generation devices that operate by tilting a track upon which a magnetic rotor is adapted to roll. In these devices, as rotor rolls along the track, it passes by a number of pickup coils in which an electric current is induced by the movement of the rotor's magnets relative to the coil. The rotor can be arranged to move in several ways, but in all cases, the rotor is caused to roll along the track by tilting the track.

SUMMARY

In a first embodiment, the rotor rolls to one end of the track before stopping and reversing to roll back along the track in an opposite direction. By such a configuration, the momentum of the rotor needs to be dissipated as it slows to a halt, before needing then to be re-accelerated in an opposite direction. This leads to undesirable losses and a corresponding reduction in efficiency.

Another configuration, which has been described in, for example, published British patent application GB2438901, involves avoiding the need for the rotor to come to a halt and reversing its direction at each end of the track. In this embodiment, the rotor continues to rotate in a constant direction, but the track is configured in a vertical hoop, such that as the rotor approaches the end of the track, it rolls up an incline before then continuing in an opposite direction, albeit being suspended beneath the track, suitably using magnetic attraction to maintain the rotor's axle in constant contact with the track. At the other end of the track, the rotor rolls back down to sit on the lower leg of the loop, whereupon the process is repeated. Unfortunately, the rotor has both rotational and linear inertia, and so even though the rotor's rotational inertia can be conserved during the transition from rolling in one direction to another, its linear inertia must be dissipated at the end of the track. Moreover, the rotor needs to rise up onto the upper leg of the track, and elevating the rotor costs energy, which also reduces the system's efficiency. Further, the magnetic forces required to maintain the rotor in a suspended configuration on the upper leg of the hooped track can introduce undesirable braking effects that also reduce the system's overall efficiency.

A need therefore arises for a power generation apparatus which is capable of operating directly from a relatively low speed input, thereby obviating the need for a gearbox assembly. A need also exists for a power generation apparatus that does not require a direct rotating mechanical input, thereby enabling it to operate directly from a reciprocating mechanical input. It is an object of the invention to provide an improved and/or alternative power generation apparatus, which addresses one or more of the above problems, and/or which provided an alternative means of generating power.

Various aspects of the invention are set forth in the appendent claims.

According to an aspect of the invention, there is provided a power generation apparatus comprising: at least one magnet mounted on an axle; at least one electrically-conductive pickup arranged, in use, such that rotation of the magnet or magnets about the axle induces an electrical current in the pickup; a guide means along which, in use, the axle rolls to rotate the magnet; and means for inclining the guide means to cause the axle to roll along it; wherein the guide means comprises an endless loop.

According to an aspect of the invention, there is provided a power generation apparatus comprising: at least one magnet, the magnet or magnets being arranged to form a substantially cylindrical rotor about an axle; at least one electrically-conductive pickup arranged, in use, such that rotation of the magnet or magnets about the axle induces an electrical current in the pickup; a guide means along which, in use, the axle rolls to rotate the magnet; means for inclining the guide means to cause the axle to roll along it; wherein the guide means comprises an endless loop formed as a track comprising a pair of rails along which the axle rolls, which rails are substantially equispaced along the entire length of the track.

According to an aspect of the invention, there is provided a plurality of rigidly interconnected power generation apparatuses, each of the said power generation apparatuses comprising: at least one magnet, the magnet or magnets being arranged to form a substantially cylindrical rotor about an axle; at least one electrically-conductive pickup arranged, in use, such that rotation of the magnet or magnets about the axle induces an electrical current in the pickup; a guide or drive means along which, in use, the axle rolls to rotate the magnet; means for moving the guide means to cause the axle to roll along it; and wherein the guide means comprises an endless loop.

According to an aspect of the invention, there is provided a power generation apparatus comprising at least one magnet, the magnet or magnets being arranged to form a substantially cylindrical rotor about an axle; at least one electrically-conductive pickup arranged, in use, such that rotation of the magnet or magnets about the axle induces an electrical current in the pickup; a guide or drive means along which, in use, the axle rolls to rotate the magnet; and means for moving the guide means to cause the axle to roll along it; and wherein the at least one electrically-conductive pickup is fixed relative to a stator, which stator at least partially surrounds the rotor and is rotatably connected to the axle such that the rotor and stator move in unison along the guide means.

According to an aspect of the invention, there is provided a power generation apparatus comprising a stator, the stator comprising a plurality of electrically-conductive pickups arranged around two or more rotors, each of the rotors comprising at least one magnet rigidly connected to an axle such that rotation of the magnet or magnets about an axis of the axle induces an electrical current in the pickups; a guide or drive means along which, in use, the axles roll to rotate the rotors; and means for moving the guide means to cause the axles to roll along it along with the stator.

Suitably, the endless loop is a planar endless loop, that is to say, when the loop is arranged in a horizontal configuration, the center of gravity of the rotor remains in a substantially constant horizontal plane. This avoids the need to unnecessarily raise or lower the rotor during its travel along the guide means. Nevertheless, the guide means is suitably arranged to tilt to cause the rotor to roll along it under the effect of gravity.

Suitably, the power generation apparatus comprised a plurality of magnets mounted on the axle, which magnet or magnets suitably comprise permanent magnets. The permanent magnet or magnets can be of any suitable type, including: a magnetic metallic magnet; a composite magnet; a rare-earth magnet; and/or a nanostructured magnet.

Suitably, the magnet or magnets are arranged evenly around the axle to balance it, and are suitably arranged to form a substantially cylindrical rotor about the axle.

A plurality of magnets mounted on a respective plurality of axles may be provided. The plurality of magnets mounted on a respective plurality of axles may roll along the guide means independently, or they may be interconnected, for example, to form a dolly or train that rolls, in use, along the guide means.

In one embodiment of the invention, a plurality of pickups is suitably arranged in a row along the path travelled by the magnet or magnets. The or each electrically-conductive pickup suitably comprises a coil, or a pair of coils located on opposite sides of the locus of the axle.

In the aforementioned embodiment of the invention, however, only the upper and lower magnets are in use at any given moment, which means that some of the magnets, and almost all of the pickups, are unused at any given instant. This could be considered to amount to poor volumetric efficiency.

A more effective, and possibly practical, configuration sees the magnet or magnets being mounted on a rotor that rotates with the axle, and the at least one electrically-conductive pickup being fixed relative to a stator, which stator at least partially surrounds the rotor and is rotatably connected to the axle such that the rotor and stator move in unison along the guide means.

Suitably, the stator is operatively connected to the guide means such that it maintains a substantially constant orientation relative thereto, for example, via a trailing connector arm that slidingly engages the guide means.

Alternatively, the stator can be rotatably connected to the axle such that it rotates about the axle in an opposite direction to the rotor, for example, via a reversing gear means interposed between the axle and the stator. The reversing gear means may comprise, in certain embodiments, an epicyclical gearbox comprising a sun gear affixed to the axle, an annular gear affixed to the stator and freewheeling planet gears interposed between the sun gear and the annular gear.

Electrical power could be drawn from the system via a suitably elongate and flexible fly lead arrangement that connects at one end to the stator, and at the other end to a power take-off means, such as an inverter or other power conditioner. In a more complex embodiment of the invention, the axle comprises a split axle comprised of first and second electrically conductive axle portions that are electrically insulated from one another, such that output power can be obtained via electrical connections to respective electrically conductive rails forming the guide means.

Suitably, the pickup or pickups are operatively connected to an output power conditioning circuit, such as a rectifier, inverter and/or a power smoothing circuit.

In a preferred embodiment of the invention, the guide means and axle or axles are magnetically attracted to one another. Such a configuration usefully maintains the axle or axles in constant contact with the guide means, thereby encouraging correct engagement and rolling of the axle or axles relative to the guide means, in use.

Suitably, the guide means comprises a track comprising a pair of rails along which the axle or axles roll. Preferably, the rails are substantially equispaced along the entire length of the track. The track may comprise substantially straight portions interconnected by banked curved portions. In one embodiment, the track comprised two substantially straight, parallel track portions interconnected by a two banked curved portions. The use of banked portions enables the rails to be of equal lengths, which obviates the need for a differential to compensate for differences in the distances travelled by the contact points of the or each axle on their respective rails.

The means for inclining the guide means may comprise a support structure to which the guide means is affixed. In such an embodiment, the support structure can be arranged to pivot about a fulcrum, and means may be provided for manipulating the support structure to cause it to pivot about the fulcrum. The fulcrum can be a single-axis fulcrum, in which case, the guide means tilts about an axis. Alternatively, the fulcrum may comprise a multi-axis fulcrum, in which case, the guide means can pivot through a range of angles.

The means for manipulating the support structure can be any one or more of the group comprising: a crank; a lever; a pneumatic piston; and a hydraulic piston. In certain embodiments of the invention, the means for manipulating the support structure is actuated by a renewable energy source.

BRIEF DESCRIPTION OF THE DRAWINGS

Preferred embodiments of the invention shall now be described, by way of example only, with reference to the accompanying drawings in which:

FIG. 1 is a side view of a first embodiment of a power generation apparatus in accordance with the invention;

FIG. 2 is a plan view of the power generation apparatus of FIG. 1;

DETAILED DESCRIPTION OF CERTAIN INVENTIVE EMBODIMENTS

Figure 4:
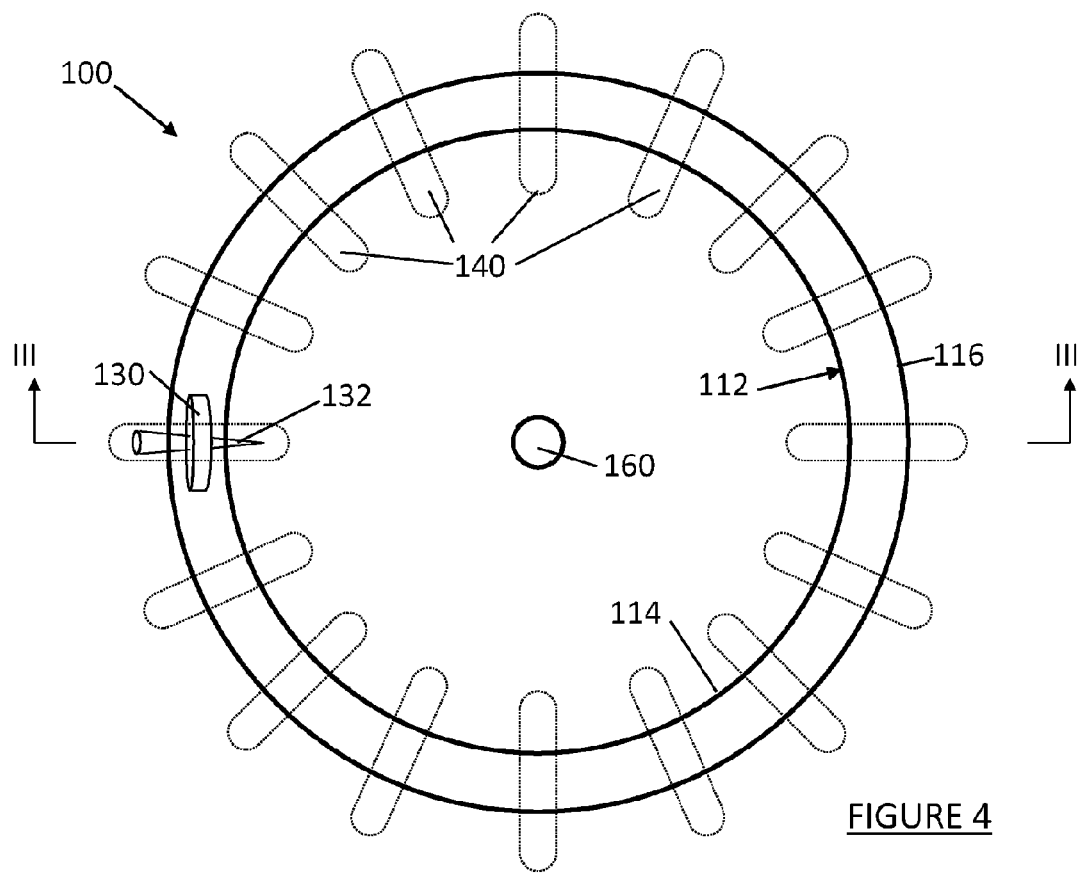
FIG. 4 is a plan view of the power generation apparatus of FIG. 3.

In FIG. 1, a power generation apparatus 10 comprises a guide means in the form of a track 12 comprised of inner 14 and outer 16 rails of equal lengths. The track 12 comprises a pair of straight, parallel sections 18 interconnected by a pair of curved, banked sections 20 to form an endless loop. The bank of the track, in the end sections 20 ensures that both rails 12, 14 are of equal lengths, the shortening effect of smaller diameter of the inner rail 14 in the banked section being accommodated for by a slight lateral extension forming an overhang 22 relative to the outer rail 16.

A pair of rotors 30 is mounted on axles 32 that are magnetically attracted to the track 12. As can be seen in FIG. 1, the track 12 can be inclined, in use, so that the rotors roll 36 along the top of the track 12 as they advance 34 laterally. The rotors 30 are interconnected by rigid linkages 38 so that they travel in unison around the track 12.

Located above and below the track is a series of coils 40 arranged in pairs. The rotors 30 each comprise a set of permanent, rare earth magnets, which create a rotating and laterally-moving magnetic field (not shown) as they roll 34, 36 along the track 12. The moving magnetic field thus induces an electrical current in the coil pairs 40, which are connected to a power conditioning circuit which converts the induced current into a useful output current.

It will be appreciated, from FIGS. 1 and 2, that the track 12 can be tilted in a first direction to cause the rotors 30 to roll from left to right in the drawings. When the rotors 30 reach the ends of the straight sections 18 of the track 12, they bank around the curved sections 20 (shown schematically towards the left of in FIG. 2), whereupon the track 12 can be tilted in an opposite direction (not shown) to cause the rotors 30 to roll along the opposite straight section 18 (i.e. from right to left in the drawings). The rotors 30 can thus roll along the track continuously provided the tilting of the track 12 is correctly synchronized with the instantaneous position of the rotors 30.

Because the rotors do not need to "climb" or reverse direction, their rotation inertia can be preserved as they advance around the banked sections 18 of the track 12. Moreover, the shape of the banked sections 18, that is to say their radius of curvature, is selected to allow the linear inertia of the rollers to be used to "slingshot" them around the bends 18, such that they never come to rest, in use. The illustrated exemplary configuration has been found to be considerably more efficient than similar systems know previously.

Figure 3:
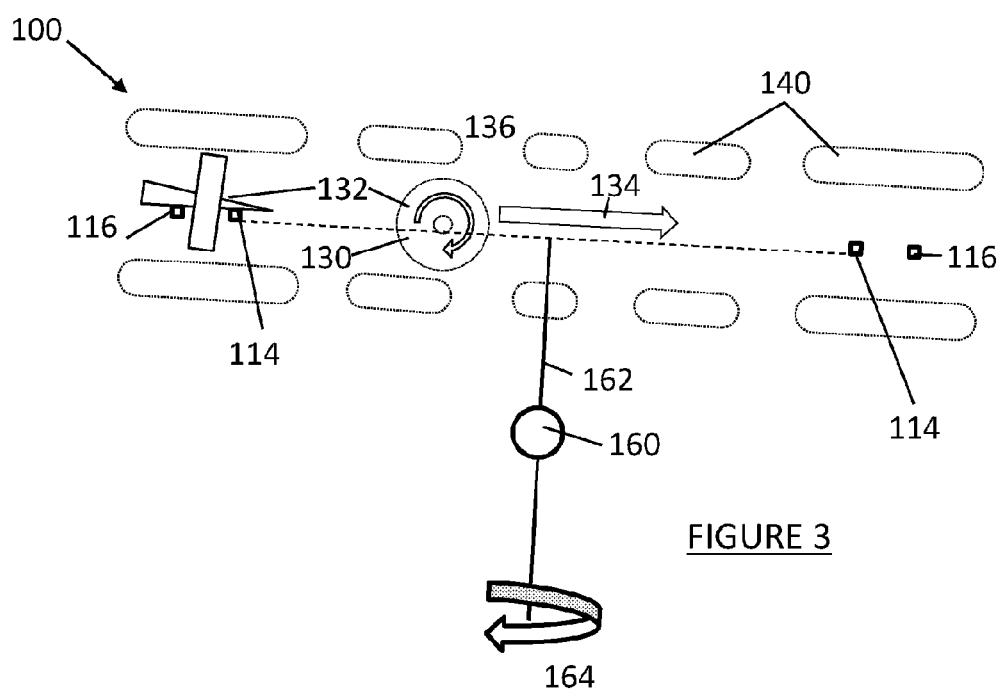
FIG. 3 is a side view of a second embodiment of a power generation apparatus in accordance with the invention.

FIGS. 3 and 4 show an alternative embodiment of the power generation apparatus 100 of the invention. In this example, a circular track 120 has been employed, whereby the inner rail 114 of the track 112 is shorter than the outer rail 116. As such, a part-conical or tapered axle 132 must be used to compensate for the difference in distance travelled by the contact points of the axle 132 on the rails 114, 116. In the embodiment shown in FIGS. 3 and 4, the track 112 is circular, and the coil pairs 140 are arranged above and below the track 112, as previously described. The rotor 130 rolls 136 along the rails 114, 116 and in so doing, advances 134 around the track 112. The rotation and movement of the magnets incorporated into the rotor 130 sets up a moving magnetic field (not shown), which induces an electrical current in the coils 140, which can be extracted, via a suitable conditioning circuit (not shown), to provide a useful output of electrical power.

In FIG. 3 it can be seen that that track 112 is mounted to pivot about a multi-axis fulcrum 160, via a lever 162. A rotational input 164 applied to one end of the lever 162 causes the track 112 to tilt about an axis intersecting the fulcrum 160. By correctly synchronizing the rotational input 164 relative to the instantaneous position of the rotor 130 on the track 112, it is possible to ensure that the rotor 130 is always running downhill on the track 112, thus continuously inducing an electrical current in at least some of the coils 140.

In both of the examples illustrated herein, the magnitude of the mechanical input 164 to cause the tilting of the track 12, 112 can be varied to effect different angles of inclination of the track 12, 112: a steeper incline resulting in a faster lateral 34, 134 and rotational 36, 136 movement of the rotors 30, 130, which in turn increases the electrical power generation, or vice-versa. Obviously, the frequency of the mechanical input will need to be adjusted to match the speed of the rotors 30, 130 to ensure that they are always located on a sloping section of the track 12, 120.

It will be appreciated that the invention can be used in conjunction with a mechanical input that can be a reciprocating mechanical input (e.g. as shown in FIGS. 1 and 2) or a rotational mechanical input 164 (e.g. as shown in FIGS. 3 and 4). However, a mechanism may be interposed between a mechanical input and the system 10, 100, such as a crank mechanism, to convert one type of input into another.

Because the invention can be configured to operate using a relatively low-frequency reciprocating input, it can, in certain embodiments, be directly coupled to a renewable energy source, such as a wave-actuated float, or a wind turbine, without (necessarily) having a gearbox or other mechanism interposed between the renewable energy source and the system 10, 100. However, an intermediate mechanism may be usefully employed, however, where the frequency and amplitude of the mechanical input varies, in which case the angle □□ and frequency □□ of the inclination of the track 12, 112 will need to be matched with that of the input to ensure correct operation (i.e. synchronization) of the system 10, 100.

Figure 5:
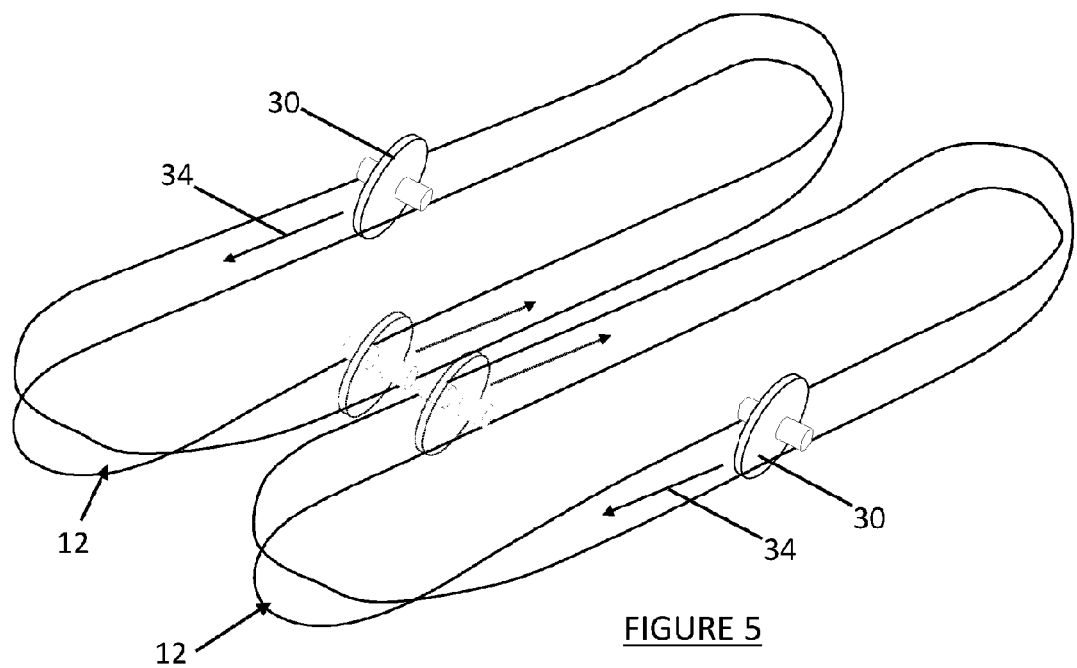
FIG. 5 is a schematic perspective view of a first mass-balanced, twin track power generation apparatus in accordance with the invention.
Figure 6:
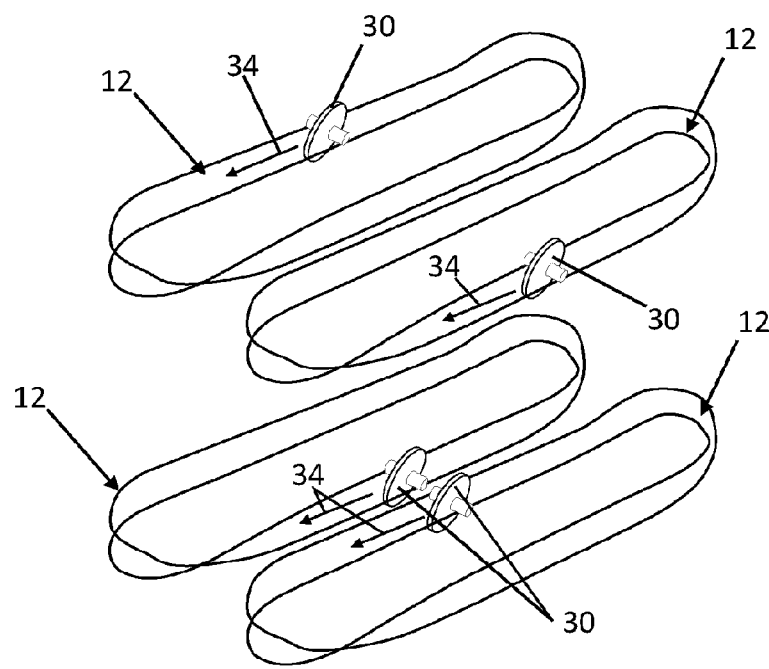
FIG. 6 is a schematic perspective view of a second mass-balanced, quad track power generation apparatus in accordance with the invention.

It will be appreciated from the foregoing that the movement of the masses of the rotors 30 may cause imbalance in the system. FIGS. 5 and 6 show embodiments of the invention whereby the mass is balanced by pairing tracks 12 in various configurations to achieve this.

In FIG. 5, for example, a pair of tracks 12 are placed side-by-side, with each track 12 carrying its own rotor 30 (or set of interconnected rotors, although this is not shown for clarity in the drawings). The arrangement of each rotor/track is substantially as described above, although certain elements of the drawings, such as the coils, have been omitted for clarity. In FIG. 5, a first track (the one on the left in the drawing) carries a rotor 30 that travels from right to left along the outside leg of the track 12 (the upper leg in the drawings), as indicated by arrow 34. At the same time, the rotor 30 on the right hand track 12 also travels from right to left (as shown by arrow 34), also on the outside leg of its track 12, which is the lower leg of the track 12 as shown in the drawing. As such, the weight of the rotors 34 move in unison, and their weights balance at all points of motion. In other words, the lateral center of gravity of the system does not shift as the rotors 30 move along their respective tracks.

A further modification of this idea is shown in FIG. 6, where there are four tracks arranged in a 2×2 array (i.e. a pair of side-by-side tracks located directly above another pair of side-by-side tracks) and four rotors 30. The rotors all move in the same direction (that is to say, from right-to-left, or from left-to-right in the drawings) and so the tracks 12 can all be rigidly interconnected and tilted using a common mechanical input. In the embodiment shown in FIG. 6, however, the outward shift of the system's overall center of gravity caused by the rotors 30 moving along the outer legs of the upper tracks is offset by the rotors on the lower pair of tracks moving along their inner legs, in unison therewith.

Figure 7:
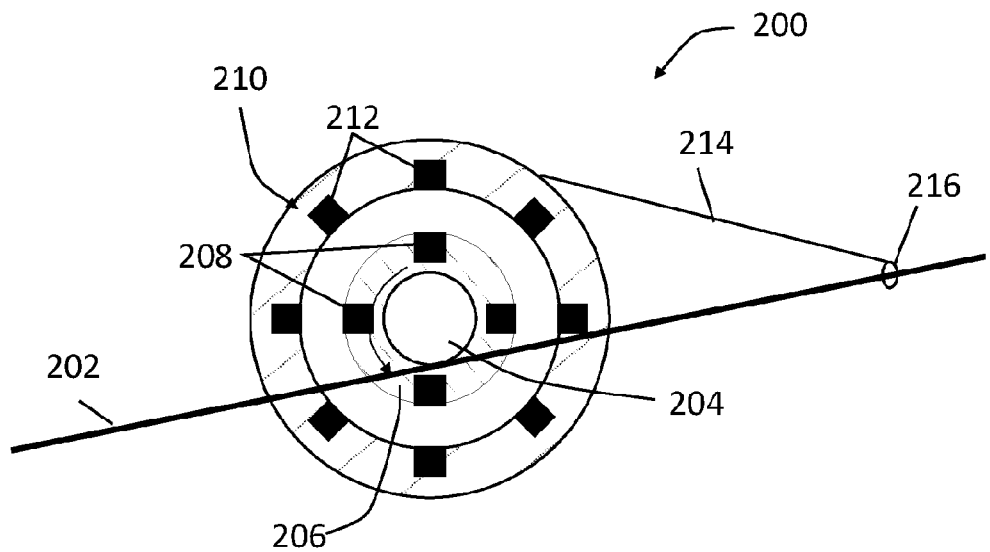
FIG. 7 is a schematic cross-section of a third embodiment of the invention comprising a stator that tracks with the rotor.

Referring now to FIG. 7, a power generation apparatus 200 comprises a track 202 comprised of a pair of spaced apart rails each forming a continuous loop, as previously described. The track 202 is inclined such that an axle 204 can roll along it (from right to left in FIG. 7) under the influence of gravity. The axle 204 is rigidly connected to a rotor 206, which comprises a number of rare earth permanent magnets 208 that rotate in unison with the axle 204 as it rolls along the track 202. A tubular stator 210 is disposed around, and concentric with, the rotor 206 and comprises a number of pickup coils 212. Rotation of the rotor 206 thus induces an electrical current in the coils.

The inductive coupling of the rotor 206 and stator 210 will tend to urge the stator to "follow", that is to say, rotate with, the rotor 206. This effect can be counteracted by the provision of a weight (not shown) on the stator 210, which biases it into a particular orientation under the effect of gravity. However, such a configuration increases the overall weight of the moving mass of the system 200, and is less preferable to the stayed system shown in FIG. 7.

In FIG. 7, the stator 210 comprises a pair of trailing arms 214 that are connected at one end to the stator 210, and at the other end, in a slidable manner (e.g. via a hook or loop 216), to each of the rails of the track 202. The trailing arms 214 prevent the stator 210 from "following" the rotor, and also provide a convenient electrical connection between the terminals of the pickup coils 212 to each of the tracks. Provided the axle 204 comprises an electrical break between the rails of the track 202, or provided it is manufactured from an electrically insulative material, the rails of the track 202 can thus be used to extract the electrical power generated by the device, in use.

Figure 8:
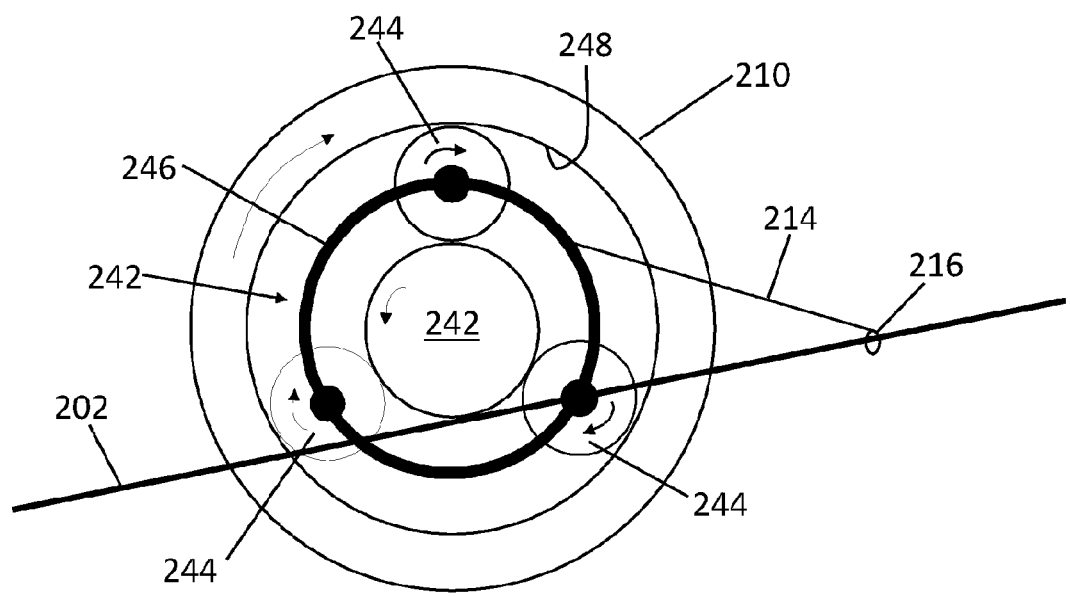
FIG. 8 is a schematic cross-section of a fourth embodiment of the invention comprising a counter-rotating stator that tracks the rotor.

In FIG. 8, a similar arrangement to that shown in FIG. 7 is shown, except that rather than staying the stator 210 to the track 202, a gear assembly 240 is used. In FIG. 8, the rotor 206 rotates in unison with the axle (not shown), which also rotates the sun gear 242 of a planetary gearbox 240. The sun gear 242 meshes with a set of planet gears 244, which are connected to a planet carrier ring 246, which is optionally stayed to the track 202 via trailing arms 214. The planet gears 244 also mesh with an outer ring gear 248, which forms the interior of, or which rotates in unison with, a tubular stator 210, similar to that previously described.

By the appropriate selection of the number of teeth on the sun gear 242, planet gears 244 and ring gear 248, the relationship between the rotation of the rotor 206 (sun gear 242) and the stator 210 (ring gear 248) can be selected at will. For example, as shown in FIG. 8, the planet carrier ring 246 can be stayed to the track 202, in which case the rotation of the stator 210 will be in an opposite direction to that of the rotor 206. Alternatively, the planter carrier 246 can be allowed to freewheel, in which case the direction and velocity of the stator 201 relative to the rotor 206 will be determined by the gear ratios and the dynamics of the system. In certain embodiments, the stator 210 can rotate in the same direction as the rotor, at any desired speed; in an opposite direction at any desired speed; or in an opposite direction at an equal speed to the rotor, thus making it maintain a constant relationship relative to the track 202.

It is contemplated that the rotor-stator arrangement illustrated in, and described with reference to, FIGS. 7 and 8 could be used in place of and/or in addition to the rotors and pickups illustrated in, and described with reference to, any of FIGS. 1 to 6. It will be appreciated that any number of tracks can be so arranged to effect balancing of the system.

Figure 9:
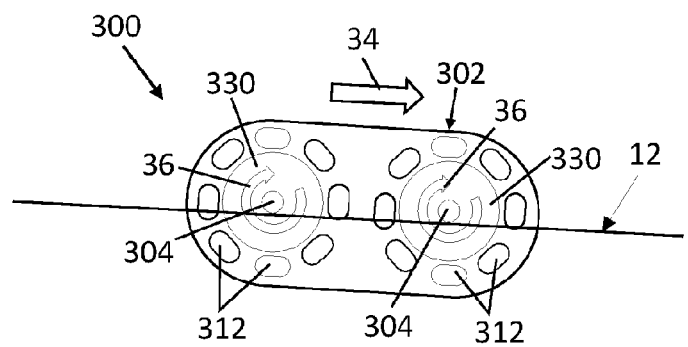
FIG. 9 is a schematic view of another embodiment of the invention comprising a dolly-type stator with two rotors.

FIG. 9 shows a hybrid power generation apparatus 300 combining some of the features of the apparatus 10 and 200 shown in FIGS. 1 and 7 of the foregoing description. In FIG. 9 it can be seen that the power generation apparatus 300 comprises a dolly in the form of a main body 302 which houses a set of electrically conductive coils 312 which are arranged around a pair of rotors 330, which rotate on magnetic axles 304. The rotors 330 comprise permanent magnets (not shown), which rotate within the coils 312 as the axles 304 roll along an inclined track 12. The rotation of the magnetic fields of the rotors 330 relative to the coils 312 induces an electrical current, which provides the power output of the apparatus 300. It will be noted that the main body 302 of the dolly replaces the linkage 38 of the embodiment shown in FIG. 1, and the arrangement of the could 312 and rotors 330 is similar to that shown in FIG. 7 of the drawings. Thus, the configuration shown in FIG. 7 simplifies the construction of the generator 300 because items, such as the trailing arm 214 can be omitted.

Figure 10:
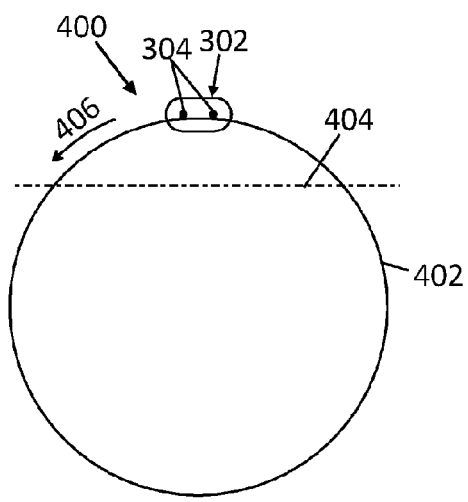
FIG. 10 is a schematic diagram illustrating a marine generator comprising a dolly-type generator as shown in FIG. 9.

The use of a dolly-type generator 300, such as that shown in FIG. 7 is particularly advantageous in certain applications. For example, the generator arrangement 400 shown in FIG. 10 sees the dolly-type generator 300 mounted to engage a circular track 402. The circular track 402 can be the outer perimeter of, say, a wind or a water turbine (not shown), which can be mounted in a tidal sea or river. The turbine can be immersed up to a water level 404 with the generator 300 located above water level 404. This particular arrangement is advantageous because of the inherent gearing effect of a large drive ring 402 compared with the small diameters of the axles 304. Thus, even relatively slow rotation 406 of the drive ring can result in relatively fast rotation of the axles 304 (and hence the rotors, which are not visible in FIG. 10). Further, because the generator 300 is located above water level 404 and because it acts on the outside edge of the drive ring 404, there is no need for a submerged gearbox, or any attachment to an axle of the turbine. The advantages of such a configuration, when applied to a marine water turbine, are readily apparent and include improved longevity of the generator and ease of servicing/maintenance (because the active components are above water level 404), cost of installation and weight reduction (because there is no gearbox—the generator is directly driven from the drive ring), etc.

Figure 11:
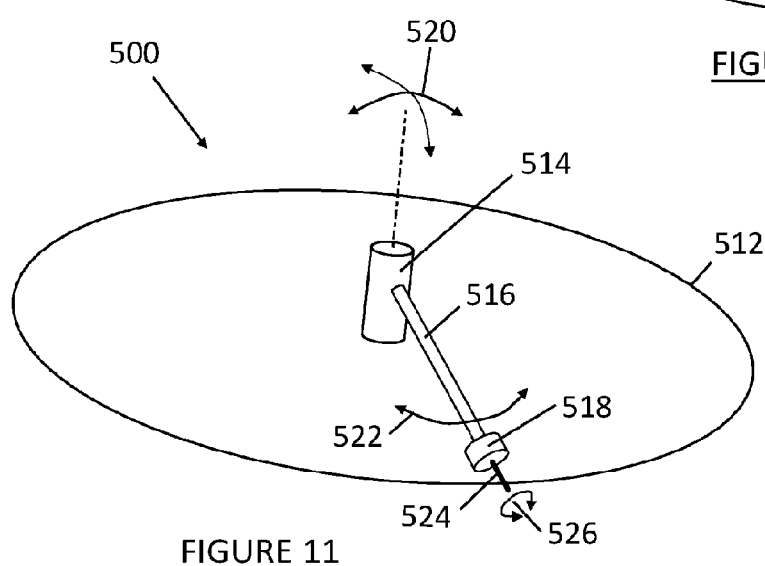
FIG. 11 is a schematic diagram of a yet further embodiment of the invention adapted for use on a multi-axis renewable energy resource, such as a buoy.

The embodiment of the invention shown in FIG. 11 is similar to that described in relation to FIGS. 4 and 5 of the foregoing description, i.e. it operates on a multi-axis tilt principle, which could, for example, be fitted to a buoy that "bobs" in a wavy sea. In FIG. 11, the generator 500 comprises a guide means 512 in the form of a metal circular track located concentrically with a pivot 514 axle. A beam 516 is mounted for rotation about the pivot axle 514 and weighted, at its free end, by a generator 518 as described hereinbefore. Tipping of the generator 500, as indicated by arrows 520 causes the beam 516 to swing around the pivot axle 514, as indicated by arrow 522.

The generator 518 comprises a stator (not visible) which is rigidly connected to the end of the beam 516, and a rotor (not visible). The stator comprises a set of coils, and the rotor comprises a set of permanent magnets arranged to rotate about an axle 524 which rolls along the track 512. Thus, as the generator 500 tips 520, the beam 516 swings 522 and the axle 524 rotates 526 to rotate the rotor and thus generate electrical power. The advantages of this embodiment of the invention are readily apparent, and similar to those described above in relation to the embodiment illustrated in FIG. 10, i.e. inherent gearing (i.e. no gearbox), reduced complexity and ease of access.

Whilst the simplified embodiment shown in FIG. 11 of the drawings shows just one axle 524, it will be appreciated that the generator could be of the "dolly-type" described in relation to FIG. 9, which would, of course, multiply-up the power generation capacity of the generator 500.

The invention is not restricted to the details of the foregoing embodiments, which are merely exemplary of the invention. For example: the shape and configuration of the track, rotors and coils may be changed; the means for converting the mechanical input into inclination of the track; the output/conditioning circuit; and the types of mechanical input, can all be varied without departing from the scope of the invention.

The following statements are not the claims, but relate to various aspects or embodiments of the invention:

Statement 1: A power generation apparatus comprising: at least one magnet mounted on an axle; at least one electrically-conductive pickup arranged, in use, such that rotation of the magnet or magnets about the axle induces an electrical current in the pickup; a guide means along which, in use, the axle rolls to rotate the magnet; means for inclining the guide means to cause the axle to roll along it; wherein the guide means comprises an endless loop.

Statement 2: The power generation apparatus of statement 1, comprising a plurality of magnets mounted on the axle.

Statement 3: The power generation apparatus of statement 1 or 2, wherein the magnet or magnets comprise permanent magnets.

Statement 4: The power generation apparatus of any preceding statement, wherein the magnet or magnets comprise any one or more of the group comprising: a magnetic metallic magnet; a composite magnet; a rare-earth magnet; and a nanostructured magnet.

Statement 5: The power generation apparatus of any preceding statement, wherein the magnet or magnets are arranged to form a substantially cylindrical rotor about the axle.

Statement 6: The power generation apparatus of any preceding statement, comprising a plurality of magnets mounted on a respective plurality of axles.

Statement 7: The power generation apparatus of statement 6, wherein the plurality of axles are interconnected to form a dolly or train that rolls, in use, along the guide means.

Statement 8: The power generation apparatus of any preceding statement, wherein the at least one electrically-conductive pickup comprises a coil.

Statement 9: The power generation apparatus of any preceding statement, comprising a plurality of pickups arranged in a row along the path travelled by the magnet or magnets.

Statement 10: The power generation apparatus of any preceding statement, wherein each pickup comprises a pair of coils located on opposite sides of the locus of the axle.

Statement 11: The power generation apparatus of any of statements 1 to 8, wherein the magnet or magnets are mounted on a rotor that rotates with the axle, and the at least one electrically-conductive pickup is fixed relative to a stator, which stator at least partially surrounds the rotor and is rotatably connected to the axle such that the rotor and stator move in unison along the guide means.

Statement 12: The power generation apparatus of statement 11, wherein the stator is operatively connected to the guide means such that it maintains a substantially constant orientation relative thereto.

Statement 13: The power generation apparatus of statement 12, further comprising a connector interconnecting the stator and the guide means.

Statement 14: The power generation apparatus of statement 11, wherein the stator is rotatably connected to the axle.

Statement 15: The power generation apparatus of statement 14, wherein the stator rotates about the axle in an opposite direction to the rotor.

Statement 16: The power generation apparatus of statement 15, comprising a reversing gear means interposed between the axle and the stator.

Statement 17: The power generation apparatus of statement 16, wherein the reversing gear means comprises a planetary gearbox comprising a sun gear affixed to the axle, an annular gear affixed to the stator and a set of planet gears interposed between the sun gear and the annular gear.

Statement 18: The power generation apparatus of statement 17, wherein the planet gears comprise freewheeling planet gears.

Statement 19: The power generation apparatus of statement 17, wherein the planet gears are operatively connected to a planet carrier ring, which planet carrier ring is operatively connected to the guide means such that it maintains a substantially constant orientation relative thereto.

Statement 20: The power generation apparatus of statement 19, further comprising a connector interconnecting the planet carrier ring and the guide means.

Statement 21: The power generation apparatus of any of statements 11 to 20, further comprising an elongate and flexible fly lead arrangement that connects at one end to the stator, and at the other end to a power take-off means.

Statement 22: The power generation apparatus of any preceding statement, wherein the pickup or pickups are operatively connected to an output power conditioning circuit.

Statement 23: The power generation apparatus of any preceding statement, wherein the guide means and axle or axles are magnetically attracted to one another.

Statement 24: The power generation apparatus of any preceding statement, wherein the guide means comprises a track comprising a pair of rails along which the axle or axles roll, which rails are substantially equispaced along the entire length of the track.

Statement 25: The power generation apparatus of any preceding statement, wherein the guide means comprises substantially straight portions interconnected by banked curved portions.

Statement 26: The power generation apparatus of statement 25, comprising two substantially straight, parallel track portions interconnected by a two banked curved portions.

Statement 27: The power generation apparatus of any preceding statement, wherein the means for inclining the guide means comprises a support structure to which the guide means is affixed, the support structure being arranged to pivot about a fulcrum, and means for manipulating the support structure to cause it to pivot about the fulcrum.

Statement 28: The power generation apparatus of statement 27, wherein the fulcrum comprises a single-axis fulcrum.

Statement 29: The power generation apparatus of statement 27, wherein the fulcrum comprises a multi-axis fulcrum.

Statement 30: The power generation apparatus of any of statements 27 to 29, wherein the means for manipulating the support structure comprises any one or more of the group comprising: a crank; a lever; a pneumatic piston; and a hydraulic piston.

Statement 31: The power generation apparatus of any preceding statement, wherein the means for manipulating the support structure is actuated by a renewable energy source.

Statement 32: A power generation system comprising a plurality of interconnected power generation apparatuses according to any preceding statement.

Statement 33: The power generation apparatus of statement 32, comprising a plurality of rigidly interconnected guide means.

Statement 34: The power generation apparatus of statement 32, comprising a pair of rigidly interconnected guide means arranged side-by-side.

Statement 35: The power generation apparatus of statement 32, comprising a pair of rigidly interconnected guide means arranged one above the other.

Statement 36: The power generation apparatus of any statement 32 or statement 33, comprising a first pair of rigidly interconnected guide means arranged side-by-side and a second pair of rigidly interconnected guide means arranged side-by-side located above the said first pair.

What is claimed is:

1. A power generation apparatus comprising:
   at least one magnet, the at least one magnet being arranged to form a substantially cylindrical rotor about an axle;
   at least one electrically-conductive pickup arranged such that rotation of the at least one magnet about the axle induces an electrical current in the pickup;
   a guide means along which the axle rolls, thereby rotating the magnet; and
   means for moving the guide means, to cause the axle to roll along the guide means; and
   wherein the at least one electrically-conductive pickup is fixed relative to a stator,
   wherein the stator at least partially surrounds the rotor and is rotatably connected to the axle such that the rotor and stator move in unison relative to the guide means.

2. The power generation apparatus of claim 1 comprising a plurality of rigidly interconnected power generation apparatuses according to claim 1, the plurality of rigidly interconnected power generation apparatuses are rigidly interconnected by the stator, the stator comprising a plurality of electrically-conductive pickups arranged around the plurality of rotors.

3. The power generation apparatus of claim 2, wherein the plurality of axles are interconnected to form a dolly or train that rolls along the guide means.

4. The power generation apparatus of claim 1, wherein the guide means comprises an endless loop.

5. The power generation apparatus of claim 1, wherein the magnet or magnets comprise any one or more of the group comprising:
   permanent magnets;
   a magnetic metallic magnet;
   a composite magnet;
   a rare-earth magnet;
   and a nanostructured magnet.

6. The power generation apparatus of claim 1, wherein the at least one electrically conductive pickup comprises a coil.

7. The power generation apparatus of claim 1, wherein the stator is rotatably connected to the axle and wherein the stator is driven to rotate about the axle in an opposite direction to the rotor by a reversing gear means interposed between the axle and the stator.

8. The power generation apparatus of claim 7, wherein the reversing gear means comprises a planetary gearbox comprising a sun gear affixed to the axle, an annular gear affixed to the stator and a set of planet gears interposed between the sun gear and the annular gear.

9. The power generation apparatus of claim 8, wherein the planet gears comprise freewheeling planet gears and wherein the planet gears are operatively connected to a planet carrier ring, which planet carrier ring is operatively connected to the guide means by a connector such that it maintains a substantially constant orientation relative thereto.

10. The power generation apparatus of claim 1, further comprising an elongate and flexible fly lead arrangement that connects at one end to the stator, and at the other end to a power take-off means.

11. The power generation apparatus of claim 1, wherein the at least one electrically-conductive pickup is operatively connected to an output power conditioning circuit.

12. The power generation apparatus of claim 1, wherein the guide means and axle are magnetically attracted to one another.

13. The power generation apparatus of claim 1, wherein the guide means comprises a track comprising a pair of rails along which the axle rolls, which rails are substantially equally spaced along the entire length of the track.

14. The power generation apparatus of claim 13, wherein the guide means comprises substantially straight portions interconnected by banked curved portions.

15. The power generation apparatus as claimed in claim 1, wherein the means for moving the guide means comprises a support structure to which the guide means is affixed, the support structure being arranged to pivot about a fulcrum, and means for manipulating the support structure to cause it to pivot about the fulcrum.

16. The power generation apparatus of claim 15, wherein the fulcrum comprises a single- or multi-axis fulcrum.

17. The power generation apparatus of claim 1, wherein the means for moving the guide means comprises a floating support structure to which the guide means is affixed.

18. The power generation apparatus of claim 1, wherein the guide means comprises a drive ring forming part of a turbine assembly, and wherein the drive ring is directly driven by the turbine assembly and wherein the axle or axles are arranged to engage and roll along the drive ring as the turbine assembly rotates.

19. The power generation apparatus of claim 1, wherein the guide means comprises a shaft forming part of a turbine assembly, and wherein the guide means comprises a drive ring directly driven by the turbine assembly, and wherein the axle or axles are arranged to engage and roll along the drive ring as the turbine assembly rotates.

20. The power generation apparatus of claim 1, further comprising a support structure and means for manipulating the support structure which comprises any one or more of the group comprising:
- a crank; a lever; a pneumatic piston; and a hydraulic piston, and
- wherein the means for manipulating the support structure is actuated by a renewable energy source.

* * * * *